(12) United States Patent
Fernandes et al.

(10) Patent No.: US 8,020,074 B2
(45) Date of Patent: Sep. 13, 2011

(54) METHOD FOR AUTO-CORRECTION OF ERRORS IN A RAID MEMORY SYSTEM

(75) Inventors: Cedric T. Fernandes, Columbia, MD (US); John Gordon Manning, Ellicott City, MD (US); Michael J. Piszczek, Laurel, MD (US); Lee Douglas McBryde, Mount Airy, MD (US); William Joseph Harker, Columbia, MD (US)

(73) Assignee: Datadirect Networks, Inc., Chatsworth, CA (US)

( * ) Notice: Subject to any disclaimer, the term of this patent is extended or adjusted under 35 U.S.C. 154(b) by 1054 days.

(21) Appl. No.: 11/844,664

(22) Filed: Aug. 24, 2007

(65) Prior Publication Data

US 2009/0055585 A1    Feb. 26, 2009

(51) Int. Cl.
    *G11C 29/00* (2006.01)
(52) U.S. Cl. ............ 714/770; 114/801; 114/6.2; 114/25
(58) Field of Classification Search .................. 714/770, 714/801, 6, 25
    See application file for complete search history.

(56) References Cited

U.S. PATENT DOCUMENTS

| | | | |
|---|---|---|---|
| 6,223,300 B1 * | 4/2001 | Gotoh | 714/5 |
| 6,453,345 B2 | 9/2002 | Trcka et al. | |
| 6,553,511 B1 * | 4/2003 | DeKoning et al. | 714/6 |
| 7,058,762 B2 * | 6/2006 | Patterson et al. | 711/114 |
| 7,073,024 B1 * | 7/2006 | Chilton | 711/114 |
| 7,127,668 B2 | 10/2006 | McBryde et al. | |
| 7,308,599 B2 * | 12/2007 | Patterson | 714/6 |
| 7,398,459 B2 * | 7/2008 | Park et al. | 714/800 |
| 7,640,484 B2 * | 12/2009 | Corbett et al. | 714/770 |

* cited by examiner

*Primary Examiner* — Esaw T Abraham
(74) *Attorney, Agent, or Firm* — Rosenberg, Klein & Lee (57) ABSTRACT

A method for auto-correction of errors in an array of disk storage devices having a plurality of disk storage devices dedicated to storing parity data to provide fault tolerance for a loss of at least two of the plurality of disk storage devices. A read operation from the storage channels transfers data to a plurality of disk channel memories. The data in the disk channel memories is checked to confirm the data is valid. Responsive to detection of invalid data, the data may be tested to identify the disk storage channel in error, including sequentially excluding data read from a different one of the plurality of disk channel memories from a parity check and determining the validity of data from remaining disk channel memories. If valid data is obtained, the disk storage channel from which the data was excluded is identified as the disk storage channel in error.

20 Claims, 4 Drawing Sheets

METHOD FOR AUTO-CORRECTION OF ERRORS IN A RAID MEMORY SYSTEM

BACKGROUND OF THE INVENTION

1. Field of the Invention

The present invention is directed to a method for correcting errors in data read from a disk drive array. More particularly, the present invention is directed to an auto-correction method utilizing a dual parity generation engine which transfers data from a cache memory to a stage buffer memory. Still further, the present invention takes advantage of the dual parity generation engine's two disk drive failure fault tolerance to deliberately map out the data from each of the disk drives of the array in a sequential manner as data is repetitively transferred between the cache memory and the stage buffer memory. Responsive to the Dual parity generation engine identifying valid data being obtained with the mapped-out disk drive being a known single drive fault, the mapped-out disk drive is identified as the disk drive in error. The valid data reconstructed by the dual parity generation engine and transferred to the stage buffer memory is subsequently transferred to the processor requesting the data to complete the read operation.

2. Background of the Invention

Computer systems often employ disk drive devices for storage and retrieval of large amounts of data. However, disk drive devices are subject to a number of possible failures that result in invalid data. Such failures can be the result of defects in the recording media, a failure in the mechanics of the disk drive mechanisms, or electrical component failures such as motors and servos, or a failure in the electronic devices which are part of the disk drive unit. To improve the reliability of disk drive storage, redundant arrays of disk drives have been utilized. Redundant arrays of inexpensive disks (RAID), also referred to as redundant arrays of independent disks have grown in usage. In the originally proposed five levels of RAID systems, RAID-5 systems has gained great popularity for use in local area networks and independent personal computer systems, such as media database systems. In RAID-5, data is interleaved by stripe units across the various disk drives of the array along with error correcting parity information. However, unlike RAID-3 wherein there is a dedicated parity disk, RAID-5 distributes parity across all of the disk drives in an interleaved fashion.

The parity data in a RAID-5 system provides the ability to correct data only for a failure of a single disk drive of the array. Data storage systems requiring a greater fault tolerance, utilize a later proposed RAID-6 system. In RAID-6, data is interleaved in stripe units distributed with parity information across all of the disk drives. To overcome the disadvantage of the RAID-5 inability to correct for a failure of more than one disk drive, the RAID-6 system utilizes a redundancy scheme that can recover from a failure of any two disk drives. The Raid-6 parity scheme typically utilize either a two-dimensional XOR algorithm or a Reed-Solomon Code in a P+Q redundancy scheme.

Even utilizing the RAID-6 architecture, such systems while having the ability to detect failures in up to two disk drives, cannot correct the data unless each disk drive in error is identified. Such is the case in the storage system architecture disclosed in U.S. Pat. No. 7,127,668, but modified with an additional parity drive for use with a dual parity engine. Without the ability to identify the disk storage channel in error, the more fault tolerant parity algorithm of the RAID-6 system is unable to provide corrected data to the requesting processor, and must therefore report a "read error" to the processor requesting the data. Thus, there is a need to provide a means for identifying the disk drive in error in such instances.

SUMMARY OF THE INVENTION

The invention of the subject patent application is directed to a method for auto-correction of errors in an array of a plurality of disk storage devices having at least a pair of the plurality of storage devices dedicated to storing parity data to provide a fault tolerance for a loss of at least two of the plurality of disk storage devices. The array is arranged in a plurality of disk storage channels. The method includes the step of performing a read operation from the array. The read operation includes respectively transferring data read from each of the plurality of disk storage channels to a corresponding disk channel memory. The method includes reading the data from the disk channel memories and performing a parity check of the data read from the disk channel memories. Further, the method includes testing the data to identify one of the plurality of disk storage channels as being in error responsive to a failure of the parity check. Responsive to identifying one of the disk storage channels as being in error, the method uses remaining other of the plurality of disk storage channels to provide valid data to a processor requesting that data, thereby auto-correcting the errors in real time in a process that is transparent to the requesting processor.

From another aspect, the method of the present invention is directed to auto-correction of errors in an array of a plurality of disk storage devices having a fault tolerance for a loss of at least two of the plurality of disk storage devices. The array is arranged in a plurality of disk storage channels. The method includes the step of performing a read operation from the array. The read operation includes respectively transferring data read from each of the plurality of disk storage channels to a corresponding disk channel memory. The method also includes the step of reading the data in the disk channel memories and determining whether the data is valid. If the data is valid, then the data is transferred to a processor requesting the data. If however the data is invalid, the method includes the step of determining which of the disk storage channels is in error. That step includes sequentially excluding data from a different one of the plurality of disk channel memories and determining if data from remaining disk channel memories provide valid data. If valid data is obtained, then the disk storage channel corresponding to the disk channel memory from which the data was excluded is designated as the disk storage channel in error. Having identified the disk storage channel in error, then the valid data obtained from the parity algorithm, utilizing the remaining disk channel memories, is transferred to the processor requesting the data.

From yet another aspect, the invention of the subject patent application is directed to a method for auto-correction of errors in a disk storage array. The method includes the step of providing a disk storage array formed by a plurality of disk storage channels. The plurality of disk storage channels is formed with at least two parity storage disk drives and a multiplicity of data disk drives. The method includes the step of providing a disk channel memory corresponding to each of the plurality of disk storage channels for temporary storage of data to be written thereto and data read therefrom. Further, the method includes the step of performing a read operation from the disk storage array. The read operation includes respectively transferring data read from each of the disk storage channels to a corresponding disk channel memory. Further, the method includes the step of transferring the data from the plurality of disk channel memories to a buffer memory and determining if the data is valid, and if valid, then transferring the data from the buffer memory to a processor requesting the data. If, however, the data is invalid, then the method includes the steps of repeating the data transfer from the plurality of disk channel memories to the buffer memory and determining if the data is valid. If the data is still invalid, and the disk storage channel in error is unidentified, then the method includes the step of determining which of the disk storage channels is in error by repeatedly transferring the data from the disk channel memories while sequentially excluding data from a different one of the plurality of disk channel memories and determining if data from remaining disk channel memories provide valid data. In that arrangement, a particular disk storage channel in error can thereby be identified so that the data from the excluded disk storage channel can be reconstructed, and valid data then provided to the requesting processor, in real time, and in a method which is transparent to the requesting processor.

DESCRIPTION OF THE PREFERRED EMBODIMENT

Figure 1:
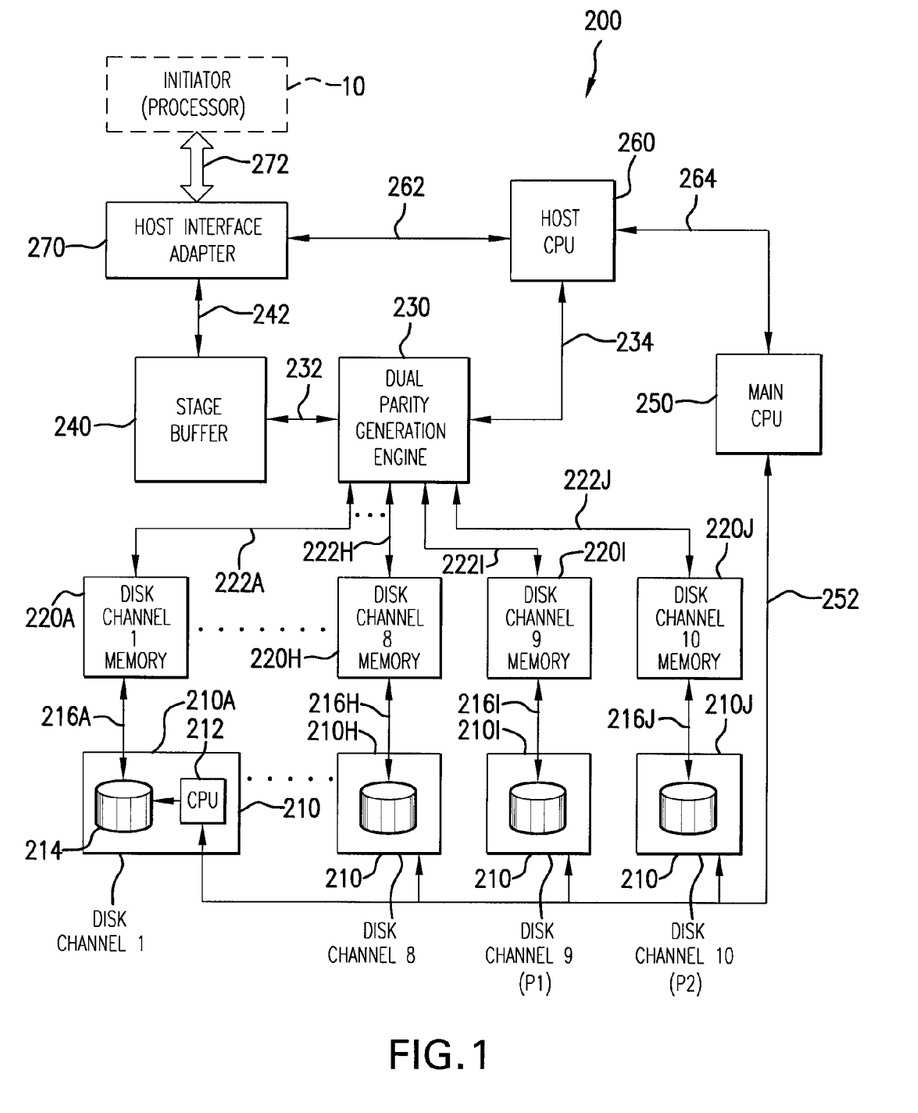
FIG. 1 is a simplified block diagram illustrating the architecture of the memory system of the present invention.

Referring now to FIG. 1, there is shown memory system 200 for storing and retrieving data for use by one or more processors 10. As will be seen in following paragraphs, memory system 200 provides for auto-correction of errors to provide valid data to a requesting processor 10, hereinafter referred to as an initiator. Although not restricted to any particular redundant array of independent disks (RAID), the auto-correction capability of memory system 200 is illustrated herein in conjunction with a RAID memory system having two disk storage device fault tolerance. To be functional, the auto-correction of errors which is transparent to the initiator requires a memory architecture which is able to tolerate the failure of at least two of the plurality of disk storage devices 210 of memory system 200. In circumstances where prior art RAID memory systems are only able to report the inability to obtain valid data, memory system 200 is able to provide corrected data efficiently, often without the need to re-read data from the disk storage devices and without the need for the initiator to request a subsequent attempt to re-read the data from the disk storage devices, and thereby provide high performance data transfer.

Memory system 200 includes an array of disk storage devices 210 for storing data and parity values corresponding to the data stored in the array. The array includes a multiplicity of data disk storage channels which in the example illustrated herein, is formed by eight disk drives 210A-210H. Data disk storage channels may be formed by more or less disk drives, the number being chosen based on such factors as the data capacity for memory system 200, cost, and reliability requirements. The array of disk storage devices 210 includes at least two parity disk storage channels 210I and 210J for storing check data corresponding to the data stripes stored in the plurality of disk storage channels 210A-210H.

While in a conventional RAID-6 system, check data is stored in two logical parity drives of the system, in actuality, the parity data is distributed in an interleaved fashion with the striped data across all of the drives of the array. Memory system 200, in a manner similar to that of a RAID-3 system, stripes the data across the plurality of data disk storage channels 1-8, and reserves dedicated parity drives for storing the parity information. Utilizing the dual parity generation engine 230, memory system 200 provides two parity disk storage channels, channels 9 and 10, to provide two physical parity disk storage channels dedicated to parity data storage. Each of the disk storage devices 210 includes a control central processing unit (CPU) 212 for controlling the operation of the disk storage media 214, which are representatively shown for only the disk storage channel 210A (for clarity). Each of the disk storage channels 210A-210J is respectively coupled to a disk channel memory 220A-220J through a corresponding data bus 216A-216J. Each of the disk channel memories 220A-220J acts as a data cache for data being read from and written to the corresponding disk storage devices 210. The disk channel memories 220A-220J may be separate and distinct dual port memories, or a single dual port memory which is divided into a plurality of subunits corresponding to the data strips for each of the disk storage channels.

The data read into the plurality of disk channel memories 220A-220J is read by a dual parity generation engine 230, processed to determine the validity of the data, and the data transferred to a stage buffer 240. The data read from the plurality of disk channel memories 220A-220J is transferred to the dual parity generation engine 230 by means of a corresponding data bus 222A-222J. The data transferred on each data bus 222A-222J includes the corresponding data read from the disk storage channels 210A-210J, plus additional parity bits added to enable detection of transmission errors between the disk channel memories 220A-220J and the dual parity generation engine 230.

The dual parity generation engine 230 may be a processor which implements a dual parity RAID algorithm utilizing software. The RAID algorithm is one of a conventional RAID-6 type process such as a two-dimensional XOR algorithm or a Reed-Solomon P+Q algorithm having the ability to detect a failure of two of the plurality of disk storage channels 210A-210J. The dual parity generation engine can also be provided as a hardware implementation of the particular dual parity RAID algorithm being utilized. Although the particular implementation of the dual parity generation engine and the dual parity RAID algorithm are not important to the inventive concepts, as described herein, a field programmable gate array implementing a two-dimensional XOR algorithm has been successfully utilized to implement the dual parity generation engine in one working embodiment of the present invention.

The dual parity generation engine 230 transfers the data to the stage buffer through a data bus 232 controlled and monitored by a host CPU 260 through a bus 234. Stage buffer 240 is a dual port memory which provides validated data to a host interface adaptor 270 through a direct memory access (DMA) bus 242. Host interface adaptor 270, under control of host CPU 260, through the host interface control bus 262, provides the data read from the stage buffer 240 to an initiator 210 through an interface bus 272. Host interface adaptor 270 provides the bus conversion between the DMA bus 242 and the interface bus 272. Interface bus 272 may be a peripheral component interconnect (PCI) bus, a peripheral component interconnect extended (PCI-X) bus, a peripheral component interconnect express (PCX) bus, hyper transport (HTX) bus, or any other internal high speed communication bus appropriate for interfacing memory system 200 with one or more initiators 10. Where memory system 200 is an external peripheral to a computer system or network, interface bus 272 may be a distributed bus such as Ethernet or fiber channel, or other high speed distributed bus architecture.

Main CPU 250 monitors and controls the operation of the plurality of disk storage channels 210A-210J through disk control bus 252. As representatively shown with respect to disk storage channel 210A, main CPU 250 communicates with a CPU 212 of each respective disk storage device 210, in order to control the read and write operations of the respective disk storage device and monitor the status thereof. Main CPU 250 communicates with the host CPU 260 through the CPU control and communications bus 264, signaling the host CPU when the read or write operations of the disk storage channels has been completed. Host CPU 260 controls the dual parity generation engine 230 through the bus 234 to test and transfer data from the plurality of disk channel memories 220A-220J to the stage buffer 240. After a transfer of valid data has been completed, CPU 260 will instruct the host interface adaptor 270 to transfer the data from the stage buffer 240 to the initiator 10.

If the transfer status returned by the dual parity generation engine 230 to the host CPU 260 indicates the data is invalid, host CPU 260 will begin the error recovery procedure. As will be discussed in following paragraphs, the first step in error recovery is to retry the original transfer from the plurality of disk channel memories 220A-220J through the dual parity generation engine 230 to the stage buffer 240. This retry of the transfer repairs most soft data errors and soft bus parity errors. If the retry does not produce valid data, the processor will determine whether the disk storage channel in error is known, as when there is a bus parity error, an identified defective disk storage device 210, or a disk storage device having known bad data, as when a new drive has been placed on-line which has not yet had its data rebuilt. Under these circumstances, the host processor 260 recovers the "bad" or missing data utilizing the parity algorithm. Absent the identification of the disk storage channel in error, conventional RAID-6 systems, while identifying that the data is invalid, are unable to reconstruct the missing or invalid data. When the disk storage channel in error is unknown, conventional RAID-6 systems are only able to confirm that the data is not valid. In order to overcome that deficiency, host CPU 260 includes an auto-correction algorithm for instructing the dual parity generation engine to perform further tests on the data to try to identify the disk storage channel in error.

Figure 2:
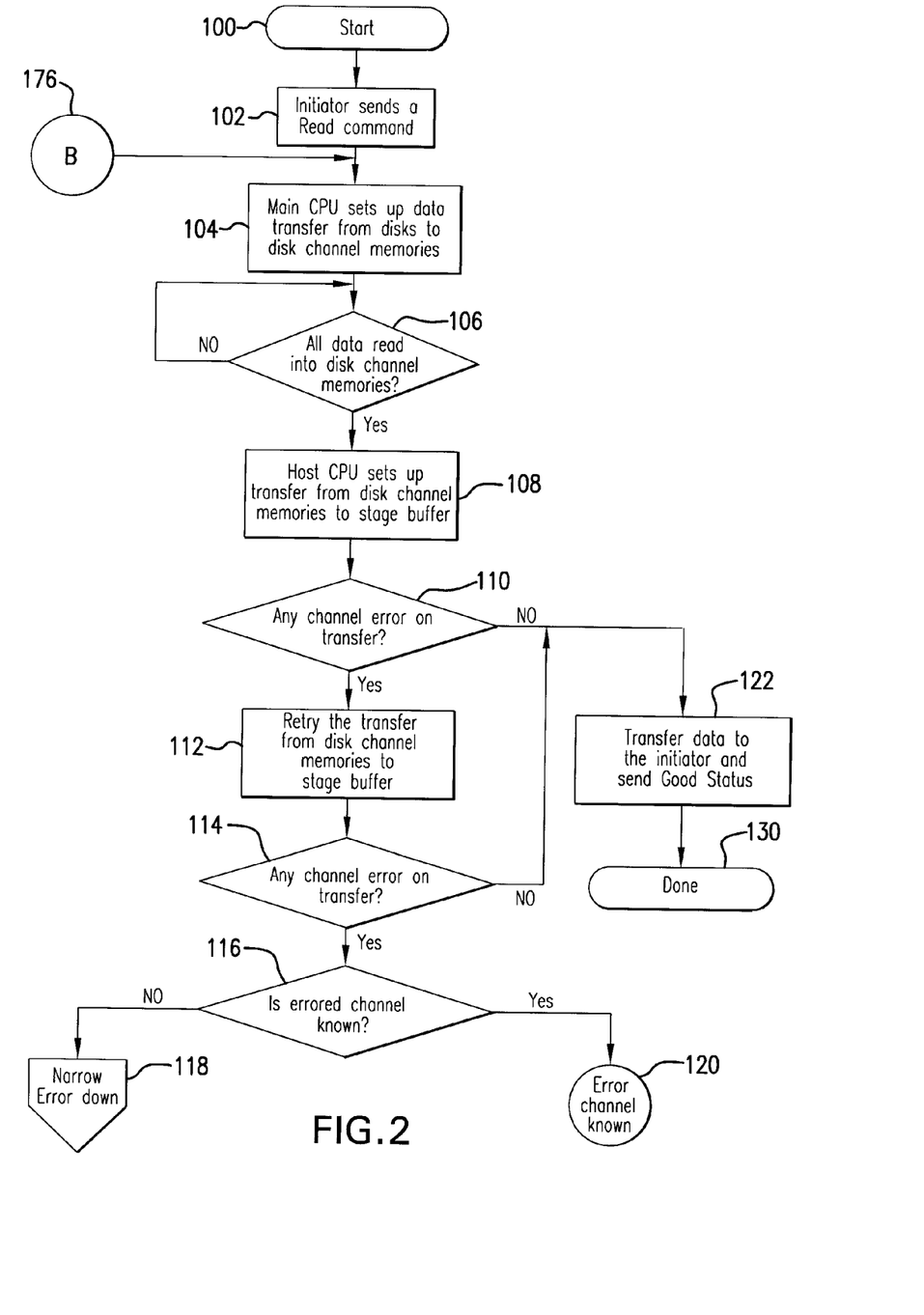
FIGS. 2, 3A and 3B represent a flow diagram of the process for reading, parity checking, determining a disk storage channel in error, and correcting data or indicating an error status thereof in the present invention.
Figure 3A:
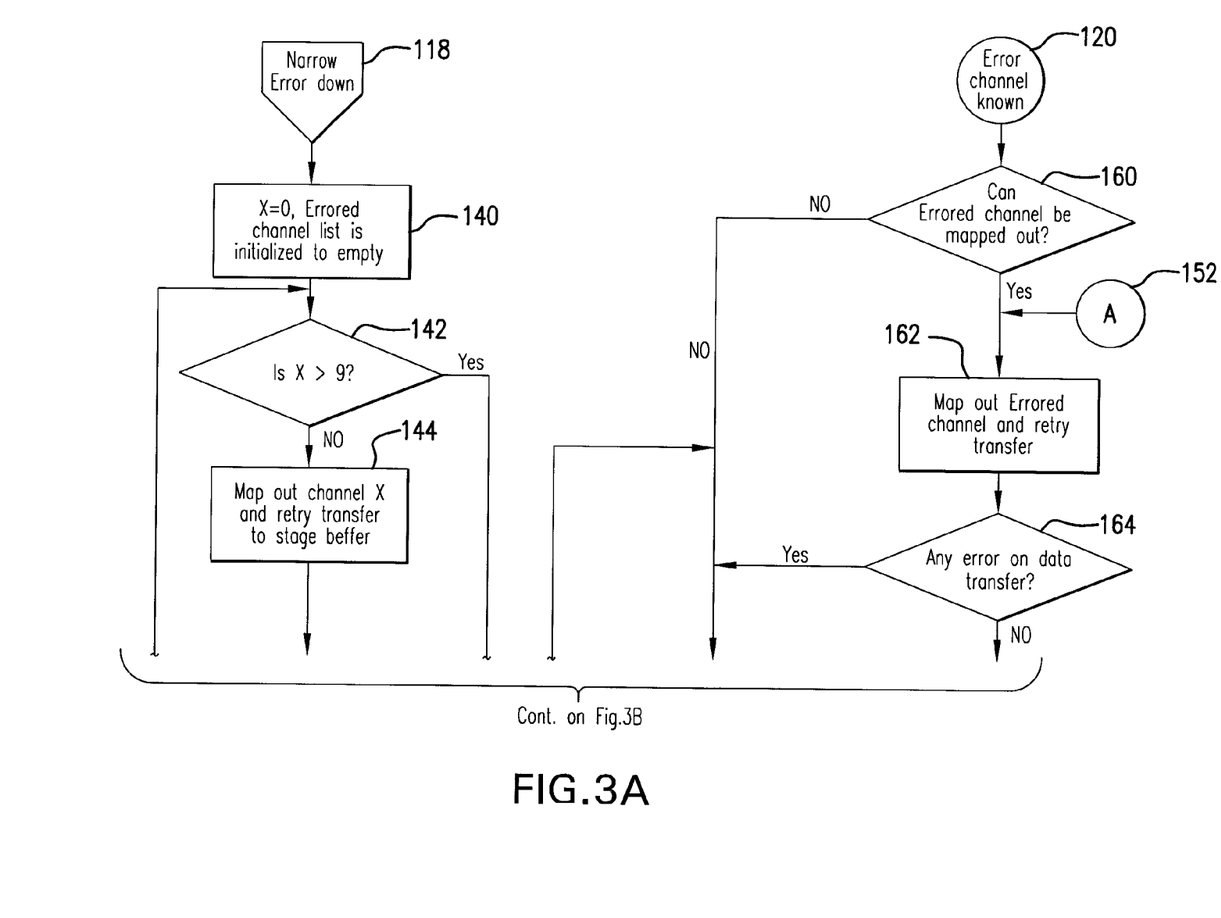
Figure 3B:
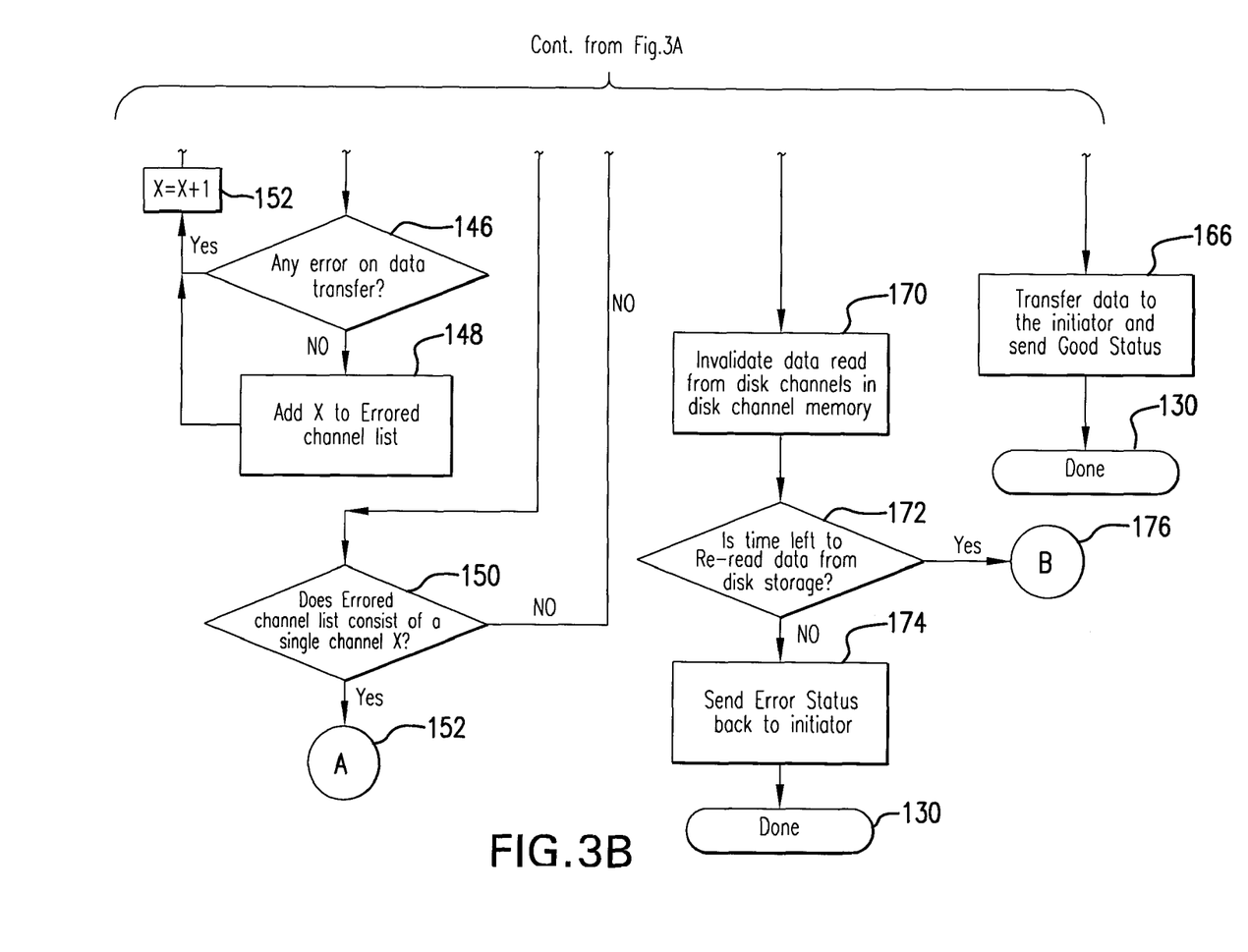

Referring now to FIGS. 2, 3A and 3B, there is shown a flow chart illustrating a read operation of memory system 200 incorporating the auto-correction algorithm provided by host CPU 260. The flow starts from block 100 and flows to block 102 wherein an initiator sends a read command through the host interface adaptor to the host CPU. The host CPU 260 communicates the read command to the main CPU 250 and the flow then moves to block 104, wherein the main CPU sets up data transfers from the plurality of disks to the disk channel memories. The flow then passes to the decision block 106 wherein it is determined whether all of the data has been read into the disk channel memories. If all of the data has not been read into the disk channel memories, the flow remains at decision block 106 until the data transfer has been completed for all of the disk storage channels. Once all of the data has been read into the disk channel memories, the flow then passes to block 108 wherein the host CPU sets up the transfer from the disk channel memories to the stage buffer. The flow then passes to decision block 110 wherein it is determined whether any channel error has occurred on the transfer to the stage buffer. If no error has been detected, the flow then passes to block 122, wherein the data is transferred from the stage buffer to the initiator and a "good" status is also sent to the initiator. From there, the routine ends with block 130.

If however, an error on transfer has been detected, the flow passes to block 112 wherein the transfer from the disk channel memories to the stage buffer is retried. From block 112, the flow then passes to decision block 114, wherein it is determined whether a channel error has been detected. If no channel error has been detected, then the flow will passes to block 122, as previously discussed. If however, an error is detected, the flow then passes to decision block 114, where it is determined whether the errored channel is known. As previously discussed, the error channel may be known due to a bus parity error, known bad disk, identified by the main CPU 250, or a disk with "bad" data, as when a new disk has been brought on-line, but has not yet had its data rebuilt, which status is also maintained by the main CPU 250. Thus, if the errored channel is known, the flow from decision block 116 passes to the connector 120, and if it is unknown which channel is in error, the flow passes to connector 118 for processing to determine the channel which is in error.

From connector 120, the flow passes to decision block 160 wherein it is determined whether the errored channel can be mapped out. The storage channel can be "mapped out" by excluding the data from that disk storage channel and utilizing the parity algorithm to recover the data. As the dual parity RAID algorithm can tolerate loss of two disk storage channels and still recover valid data, the decision block will be answered in the affirmative as long as no more than two disk storage channels are in error, for the conventional RAID-6 algorithm. Obviously, where a greater fault tolerance is required, and further parity disk storage channels are added, other algorithms may be utilized to recover more than a loss of two disk storage channels.

If decision block 160 is answered in the affirmative, the flow passes to block 162, wherein the errored channel is mapped out and the transfer from the remaining disk storage channels is transferred through the dual parity generation engine 230 to the stage buffer 240, with the missing data recovered utilizing the dual parity RAID algorithm. Flow then passes to decision block 164, wherein it is determined whether the data transfer has successfully transferred valid data, to the stage buffer 240. If no data transfer errors have been detected, then flow passes to block 166. In block 166 the data is transferred from the stage buffer 240 to the initiator 10 through the host interface adaptor 270. From block 166, the flow then exits the routine at block 130.

If at decision block 160, the known error channel cannot be mapped out, as when there are already two identified channels in error, the flow passes to block 170 wherein data read from the disk storage channels 210A-210J to the corresponding disk channel memory 220A-220J is invalidated. The consequences of the data being invalidated will be described in following paragraphs. Next, the flow passes to decision block 172 where it is determined if there is sufficient time to re-read the data from the disk storage devices 210. The initiator 10 expects to receive a response to a READ request within a certain time period (timeout period) so that it does not waste resources waiting for a response from system 200. System 200 likewise has a timeout period established in which to transfer data to the initiator 10. The timeout period of system 200 is typically established to be slightly less than that of the initiator 10, and if valid data is not transferred to the initiator 10 by the expiration of the system 200 timeout period, an error message is sent to initiator 10 before it has "timed out." Thus, at this point in the logic, if there is sufficient time left in the timeout period of system 200 to re-read the data from the disk storage devices, then the flow passes to the connector 176 to bring the flow back to block 104 to repeat the process as described in the preceding paragraphs. By this arrangement, even a re-reading of data from the disk storage devices is accomplished in a manner that is transparent to the initiator, in real time. If in decision block 172 it is determined that insufficient time remains in the timeout period to re-read the data, the flow passes to block 174. In block 174 an error status is sent to the initiator by the host CPU 260. From block 174, the flow then exits the routine at block 130.

In order to provide high performance, memory system 200 provides a sufficiently large disk channel memory 220A-220J to store data from multiple read operations. Therefore, the data from one read operation which is stored in the disk channel memories 220A-220J is available for transfer to the initiator 10 on a subsequent request, or transfer to a different initiator requesting the same data. Transferring the data from a cache storage provides for a far greater access speed for memory system 200. Where data has been invalidated in block 170, that data is not maintained in the disk channel memories, and in fact is not mapped to storage locations of disk channel memories. Therefore, a subsequent read request for that same block of data will not be provided from the disk channel memories, but instead reread from the disk storage channels 210A-210J so that the processing in the dual parity generation engine 230 can take place with fresh data.

The ability to utilize the data stored in the disk channel memories 220A-220J permits the error channel processing, as now will now be described, to be accomplished in real time without significantly degrading the performance of memory 200, to provide error processing that is transparent to the initiator. When the errored channel is not known, flow passes from decision block 116, through the connector 118, to block 140, wherein the routine is initialized and a starting channel is reset to zero. From block 140, the flow passes to decision block 142, where it is determined whether the variable X has been incremented to a value which is greater than the total number of disk storage channels in memory system 200, in the example described herein, greater than a value of 9 which represents a disk storage channel greater than 10. If the value of the variable X has not exceeded the total number of disk storage channels, then the flow passes to block 144. In block 144, the disk storage channel identified by the variable X (X=0 identifies disk storage channel 1 (210A)) is mapped out and the transfer from the disk channel memories corresponding to the other, non-mapped out, disk storage memories is processed by the Dual parity generation engine while being transferred to the stage buffer. From block 144, the flow passes to decision block 146, wherein it is determined whether an error is detected on the data transfer, exclusive of the mapped-out disk storage channel. If no error is now detected, then the mapped-out channel is responsible for the original error, which could not previously be identified, and thus, the flow passes to block 148. In block 148, the mapped-out disk storage channel number is stored in an error channel list. From block 148, and from decision block 146 wherein an error on data transfer is detected, flow passes to block 152, wherein the channel number is incremented and then the flow passes back to decision block 142 to repeat the sequence of steps just described.

By this arrangement, each of the plurality of disk storage channels is successively mapped out and the data transfer repeated so as to try to determine the identification of a disk storage channel from which invalid data was obtained, with respect to the read operation requested by the initiator. Once all of the disk storage channels have been sequentially mapped out, the flow passes from decision block 142 to decision block 150. In decision block 150, it is determined whether the errored channel list consists of a single identified channel. If the channel list consists of more than one channel, then the flow passes to block 168, to send an error status back to the initiator, since without the error channel being confined to a single channel, the certainty of the identification of the disk storage channels in error cannot be assured.

If however, the channel list identifies a single channel, then the flow passes from block 150 to block 162 through the connector 152. As previously described, the identified channel is mapped out, the transfer repeated, and the data recovered for the mapped out drive utilizing the RAID-6 algorithm. Since the transfers through the dual parity generation engine to the stage memory are provided by the disk channel memories, those transfers are performed at a high data rate, and thus the performance of memory system 200 is considerably greater than if the data had to be re-read from the disk storage devices 210 each time the validity of the data had to be tested when a disk storage channel was mapped out. In fact, due to the probability for read errors from disk storage devices, there would be some measure of uncertainty as to the repeatability of disk storage channel error on any particular disk storage channel and an uncertainty as to developing an error in a different disk storage channel, if such testing had to be carried out by accessing the disk storage devices each time a different disk storage channel was to be mapped-out. Thus, based on current disk drive performance, both performance and reliability would suffer if the method of the instant invention were implemented using consecutive accesses of the disk storage devices.

Therefore, it can be seen that memory system 200 utilizes a method for auto-correction of errors array of a plurality of disk storage devices 210 wherein at least a pair 210I and 210J of the plurality of storage devices 210 are dedicated to storing parity data to provide a fault tolerance for a loss of at least two of the plurality of disk storage devices 210. The array of disk storage devices 210 are arranged in a plurality of disk storage channels 210A-210J, which in response to a read operation results in the transfer of data read from each of the disk storage channels 210A-210J to a corresponding disk channel memory 220A-220J. Subsequently, the data stored in the plurality of disk channel memories 220A-220J is parity checked to determine if the data is valid. Responsive to a failure of the parity check, the data is tested to identify the disk storage channel which is in error. Once the disk storage channel in error is identified, the remaining other of the plurality of disk storage channels are utilized to reconstruct valid data.

In order to identify the disk storage channel which is in error, a process of sequentially excluding data from a different one of the plurality of disk channel memories 220A-220J is carried out, each time determining if data from the remaining disk channel memories provide valid data. If valid data is produced, then the drive which has been "mapped out" (data excluded from the parity check and transfer to the stage buffer) is designated as the disk storage channel which was in error. If however, the sequential testing fails to identify a single disk storage channel which is in error, the data stored in each of the disk channel memories 220A-220J, responsive to the particular read operation from the plurality of disk storage channels 210A-210J, is invalidated, so that a subsequent read request for that same data will require the data to be re-read from the plurality of disk storage channels 210A-210J. Subsequent to the invalidation of the data in the disk channel memories, the data is re-read from plurality of disk storage channels 210A-210J and the validation and auto-correction processing repeated, if sufficient time exists before expiration of a time period established for a read operation. Absent sufficient time to repeat the aforesaid method, an error message is output to the processor requesting the data from memory system 200.

The data which is read from the plurality of disk channel memories 220A-220J is processed by a dual parity generation engine 230 and transferred to a state buffer memory 240. Part of the dual parity RAID processing includes determining whether a bus parity error has occurred for any of the plurality of disk storage channels prior to initiating the sequential testing of the data stored in the plurality of disk channel memories 220A-220J. Further, the host CPU 260 communicates information as to any of the plurality of disk storage devices 210 which have previously been identified as being defective, or for which the data stored thereon is invalid, as when a new disk drive has been installed and the data not yet rebuilt.

While the present invention has been particularly described with reference to FIGS. 1, 2, 3A and 3B, a particular number of disks in the disk drive array, and a particular arrangement of processors to control operation of the memory system, it should be understood that the Drawing figures are for illustration only and should not be taken as limitations upon the invention. It is further contemplated that many changes and modifications may be made to the invention, by one of ordinary skill in the art, without departing from the spirit and scope of the invention as disclosed herein. In particular, equivalent elements may be substituted for those specifically shown and described, various method steps may be interchanged, and while the present invention has been described as advantageously implemented in various hardware and software components, it will be appreciated that some of those components implemented in hardware, may be implemented equally well in software, and conversely, some elements implemented in software may be implemented in hardware as well, all without departing from the spirit or scope of the invention as defined in the appended claims.

What is being claimed is:

1. A method for auto-correction of errors in an array of a plurality of disk storage devices having at least a pair of said plurality of storage devices dedicated to storing parity data to provide a fault tolerance for a loss of at least two of said plurality of disk storage devices, said array being arranged in a plurality of disk storage channels, the method comprising the steps of:
   a. performing a read operation from said array, said read operation including respectively transferring data read from each said plurality of disk storage channels to a corresponding disk channel memory;
   b. reading said data from said disk channel memories and performing a parity check of said data read from said disk channel memories;
   c. responsive to a failure of said parity check in an unidentified disk storage channel, testing said data to identify one of said plurality of disk storage channels as being in error; and
   d. responsive to identifying said one disk storage channel as being in error, using remaining other of said plurality of disk storage channels to provide valid data to a processor requesting said data.

2. The method as recited in claim 1, wherein the step of testing said data to identify one of said plurality of disk storage channels as being is in error includes the step of sequentially excluding data read from a different one of said plurality of disk channel memories from said parity check and determining if data from remaining disk channel memories provide valid data to thereby designate a disk storage channel corresponding to said disk channel memory from which data was excluded as said disk storage channel in error.

3. The method as recited in claim 1, further comprising the step of invalidating said data read from each said plurality of disk storage channels in said corresponding disk channel memory responsive to failing to identify any one of said disk storage channels being in error.

4. The method as recited in claim 3, wherein the step of invalidating said data read from each said plurality of disk storage channels is followed by the step of repeating steps a.-d. if sufficient time exists before expiration of a time period established for a read operation.

5. The method as recited in claim 2, wherein the step of sequentially excluding data read from a different one of said plurality of disk channel memories is preceded by the step of determining whether a bus parity error has occurred for any of said plurality disk storage channels.

6. The method as recited in claim 1, wherein the step of reading said data from said disk channel memories includes the step of using a dual parity generation engine to transfer said data from said disk channel memories to corresponding buffer memories and performing said parity check.

7. The method as recited in claim 2, wherein the step of sequentially excluding data read from a different one of said plurality of disk channel memories is preceded by the step of determining whether a disk storage channel has been identified with a defective disk storage device or invalid data.

8. A method for auto-correction of errors in an array of a plurality of disk storage devices having a fault tolerance for a loss of at least two of said plurality of disk storage devices, said array being arranged in a plurality of disk storage channels, the method comprising the steps of:
   a. performing a read operation from said array, said read operation including respectively transferring data read from each said plurality of disk storage channels to a corresponding disk channel memory;
   b. reading said data in said disk channel memories and determining whether said data is valid, and if said data is valid transferring said valid data to a processor requesting said data; and
   c. if said data is invalid, determining which of said disk storage channels is in error, said step of determining which of said disk storage channels is in error includes:
      sequentially excluding data from a different one of said plurality of disk channel memories and determining if data from remaining disk channel memories provide valid data; and,
      if valid data is obtained, designating a disk storage channel corresponding to said disk channel memory from which data was excluded as said disk storage channel in error, and transferring said valid data to the processor requesting said data.

9. The method as recited in claim 8, further comprising the step of invalidating said data read from each said plurality of disk storage channels in said corresponding disk channel memory if valid data fails to be obtained after the step of sequentially excluding data from a different one of said plurality of disk channel memories.

10. The method as recited in claim 9, wherein the step of invalidating said data read from each said plurality of disk storage channels is followed by the step of repeating steps a.-c. if sufficient time exists before expiration of a time period established for a read operation.

11. The method as recited in claim 8, wherein the step of determining which of said disk storage channels is in error includes the step of determining whether a bus parity error has occurred for any of said plurality disk storage channels.

12. The method as recited in claim 8, wherein the step of performing a read operation is preceded by the step of providing said array with at least two disk drives dedicated to storing parity data.

13. The method as recited in claim 8, wherein the step of reading said data in said disk channel memories and determining whether said data is valid includes the step of using a dual parity generation engine to transfer said data from said disk channel memories to corresponding buffer memories and establishing an integrity thereof.

14. The method as recited in claim 8, wherein the step of sequentially excluding data read from a different one of said plurality of disk channel memories is preceded by the step of determining whether a disk storage channel has been identified with a defective disk storage device or invalid data.

15. A method for auto-correction of errors in a disk storage array, comprising the steps of:
  a. providing a disk storage array formed by a plurality of disk storage channels, said plurality of disk storage channels being formed with at least two parity storage disk drives and a multiplicity of data disk drives;
  b. providing a disk channel memory corresponding to each of said plurality of disk storage channels for temporary storage of data to be written thereto and data read therefrom;
  c. performing a read operation from said disk storage array, said read operation including respectively transferring data read from each said disk storage channel to said corresponding disk channel memory;
  d. transferring said data from said plurality of disk channel memories to a buffer memory and determining if said data is valid, and if valid transferring said data from said buffer memory to a processor requesting said data;
  e. if said data is invalid, then:
    i.) repeating step d.; and
    ii.) if said data is invalid after repeating step d. and the disk storage channel in error is unidentified, then determining which of said disk storage channels is in error by repeatedly transferring said data from said disk channel memories while sequentially excluding data from a different one of said plurality of disk channel memories and determining if data from remaining disk channel memories provide valid data.

16. The method as recited in claim 15, further comprising the step of invalidating said data read from each said plurality of disk storage channels in said corresponding disk channel memory responsive to failing to identify any one of said disk storage channels being in error.

17. The method as recited in claim 16, wherein the step of invalidating said data read from each said plurality of disk storage channels is followed by the step of repeating steps a.-e. if sufficient time exists before expiration of a time period established for a read operation.

18. The method as recited in claim 15, wherein the step of transferring said data from said plurality of disk channel memories to said buffer memory and determining if said data is valid is performed by a dual parity generation engine.

19. The method as recited in claim 15, wherein the step of determining if said data is valid includes the step of determining whether a bus parity error has occurred for any of said plurality disk storage channels.

20. The method as recited in claim 15, wherein the step of repeating step d. if said data is invalid is preceded by the step of determining whether a disk storage channel has been identified with a defective disk storage device or invalid data.

* * * * *